(12) United States Patent
Gromotka

(10) Patent No.: US 11,747,649 B2
(45) Date of Patent: Sep. 5, 2023

(54) METHOD FOR PRODUCING A COATING ON A SPECTACLE LENS, AND SPECTACLE LENS

(71) Applicant: Carl Zeiss Vision International GmbH, Aalen (DE)

(72) Inventor: Jeremias Gromotka, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 1111 days.

(21) Appl. No.: 16/449,027

(22) Filed: Jun. 21, 2019

(65) Prior Publication Data

US 2019/0310492 A1 Oct. 10, 2019

Related U.S. Application Data

(63) Continuation of application No. PCT/EP2017/084463, filed on Dec. 22, 2017.

(30) Foreign Application Priority Data

Dec. 22, 2016 (EP) .................................... 16206331

(51) Int. Cl.
*G02C 7/02* (2006.01)
*B29D 11/00* (2006.01)
(Continued)

(52) U.S. Cl.
CPC ........ *G02C 7/021* (2013.01); *B29D 11/00865* (2013.01); *B41M 3/003* (2013.01);
(Continued)

(58) Field of Classification Search
CPC . G02C 7/021; C08J 7/044; C08J 7/046; C08J 7/054; C08J 7/043; C08J 7/0423;
(Continued)

(56) References Cited

U.S. PATENT DOCUMENTS 4,673,609 A 6/1987 Hill
5,073,009 A * 12/1991 Tovi ..................... G02C 7/021
351/159.63
(Continued)

FOREIGN PATENT DOCUMENTS

CN 102749722 A 10/2012
CN 103502877 A 1/2014
(Continued)

OTHER PUBLICATIONS

"Ophthalmic optics—Spectacle lenses—Vocabulary (ISO 13666:2012)," German and English version EN ISO 13666:2012, Oct. 2013.
(Continued)

*Primary Examiner* — William R Alexander
*Assistant Examiner* — Sharrief I Broome
(74) *Attorney, Agent, or Firm* — Tautz & Schuhmacher LLC; Georg M. Hasselmann

(57) ABSTRACT

A method for producing a coating on a surface of a coated or uncoated spectacle lens includes: applying a masking on a partial region of the surface of the coated or uncoated spectacle lens, applying at least one layer on the surface, and removing the masking and the at least one layer applied on the masking from the partial region of the surface. The masking is applied with a matrix printing method. A spectacle lens produced by the method is also disclosed.

17 Claims, 7 Drawing Sheets

(51) Int. Cl.
  *B41M 3/00* (2006.01)
  *B44F 1/06* (2006.01)
  *B44C 1/00* (2006.01)
  *C08J 7/04* (2020.01)
  *C08J 7/043* (2020.01)
  *C08J 7/044* (2020.01)
  *C08J 7/046* (2020.01)
  *C08J 7/054* (2020.01)

(52) U.S. Cl.
  CPC .................. *B44C 1/00* (2013.01); *B44F 1/06* (2013.01); *C08J 7/043* (2020.01); *C08J 7/044* (2020.01); *C08J 7/046* (2020.01); *C08J 7/0423* (2020.01); *C08J 7/054* (2020.01); *C08J 2375/04* (2013.01)

(58) Field of Classification Search
  CPC ........... C08J 2375/04; B29D 11/00865; B41M 3/003; B44C 1/00
  See application file for complete search history.

(56) References Cited

U.S. PATENT DOCUMENTS

| | | |
|---|---|---|
| 7,838,068 B2 | 11/2010 | Lacan et al. |
| 8,545,014 B2 | 10/2013 | Neuffer |
| 8,958,160 B2 | 2/2015 | Wu |
| 8,982,466 B2 | 3/2015 | Neuffer |
| 9,122,073 B2 | 9/2015 | Macionczyk et al. |
| 9,278,492 B2 | 3/2016 | Okubo et al. |
| 9,678,363 B2 | 6/2017 | Ang et al. |
| 9,778,484 B2 | 10/2017 | Hugenberg et al. |
| 9,817,155 B2 | 11/2017 | Neuffer |
| 2009/0081378 A1* | 3/2009 | Hsu .................. B29D 11/00009 427/534 |
| 2013/0308217 A1* | 11/2013 | Schauer ................ G02C 7/108 359/839 |
| 2014/0016083 A1 | 1/2014 | Macionczyk et al. |
| 2014/0099439 A1* | 4/2014 | Okubo ............. B29D 11/00317 427/164 |
| 2014/0300856 A1 | 10/2014 | Dangelmaier et al. |
| 2015/0277143 A1 | 10/2015 | Lippens et al. |
| 2016/0026000 A1* | 1/2016 | Kester .............. B29D 11/00865 427/164 |

FOREIGN PATENT DOCUMENTS

| | | |
|---|---|---|
| CN | 105556346 A | 5/2016 |
| DE | 19848591 A1 | 10/1999 |
| DE | 102013208310 A1 | 11/2014 |
| EP | 1392613 A1 | 3/2004 |
| EP | 2437084 A1 | 4/2012 |
| EP | 2437085 A1 | 4/2012 |
| EP | 2685306 A1 | 1/2014 |
| EP | 3067720 A1 | 9/2016 |
| WO | 02092524 A1 | 11/2002 |
| WO | 2008080020 A1 | 7/2008 |
| WO | 2010084272 A1 | 7/2010 |
| WO | 2016142496 A1 | 9/2016 |

OTHER PUBLICATIONS

International Search Report of the International Searching Authority issued in PCT/EP2017/084463, to which this application claims priority, and English-language translation thereof, dated Apr. 9, 2018.

International Preliminary Examination Report of the International Searching Authority issued in PCT/EP2017/084463, to which this application claims priority, and English-language translation thereof, dated Mar. 6, 2019.

Office Action by the Chinese Patent Office issued in CN 201780079556.6, which is a counterpart hereof, dated Jan. 22, 2020, and English-language machine translation thereof.

* cited by examiner

— METHOD FOR PRODUCING A COATING ON A SPECTACLE LENS, AND SPECTACLE LENS

CROSS REFERENCE TO RELATED APPLICATIONS

This application is a continuation application of international application PCT/EP2017/084463, filed on Dec. 22, 2017, which claims priority to European patent application EP 16 206 331.7, filed on Dec. 22, 2016, both of which are hereby incorporated by reference in their entireties.

TECHNICAL FIELD

The present disclosure relates to a method for producing a coating on at least one surface of a coated or uncoated spectacle lens, comprising the following steps: applying at least one masking on at least one partial region of at least one surface of the coated or uncoated spectacle lens, applying at least one layer on the at least one surface and on the at least one masking, and removing the at least one masking and the at least one layer applied on the at least one masking from the at least one partial region of the at least one surface. The disclosure furthermore relates to the spectacle lens produced by the method, and to a spectacle lens, wherein the spectacle lens is coated or uncoated, comprising at least one masking of at least one partial region of at least one surface of the coated or uncoated spectacle lens.

BACKGROUND

Methods for producing coatings on spectacle lenses are known from the related art. Examples of such coatings comprise antireflection layers or antireflective layers, for example. Spectacle lenses are provided with so-called antireflection layers to avoid disturbing reflections. This usually involves a layer sequence in which layers having a first refractive index and layers having a second refractive index, which is different, typically higher, than the first refractive index, are applied alternately. Such antireflection layers should have, besides good antireflection properties, the least possible susceptibility to mechanical loads. Such antireflection layers are known for example from EP 2 437 084 A1. Further coatings are disclosed for example in DE 10 2013 208 310 A1, EP 3 067 720 A1, EP 2 437 085 A1, WO 2016/142496 A1, WO 2010/084272 A1, and WO 2008/080020 A1.

Antireflection layers are used to suppress the reflection from optical surfaces of a spectacle lens and to increase the light transmission. In this case, the reduction of reflection is based on the principle of interference at thin layers. The antireflection layer generally consists of a plurality of thin layers having a thickness of a few 10 nm and having different refractive indices, the thin layers being arranged one above another. Antireflection layers generally result in a colored residual reflection, wherein the reflection color is determined by the position of the maximum of the reflection curve as a function of the wavelength. Antireflection layers can be applied by conventional coating methods, e.g., by means of box coaters, only in an a really undifferentiated manner, such that a reproduction of an arbitrary reflection image by selectively omitting a portion of the layers of the antireflection layer or a portion of the complete antireflection layer, in each case on at least one surface of the coated or uncoated spectacle lens, is not possible in this way.

In the related art, it is already known to make use of such reflection images on spectacle lenses, which arise as a result of selectively omitting a complete antireflection layer or a portion of the layers of the antireflection layer. The representation of the reflection image on at least one surface of a spectacle lens is carried out in this case by way of a printing plate, which is costly to produce and which is worthwhile economically only for spectacle lenses manufactured in relatively large numbers because a printing plate has to be kept available per production line and reflection image to be represented. A printing plate is used to apply reflection images in particular in the case of spectacle lenses for sunglasses that are produced in relatively high numbers and do not have a corrective power. For small series for which it is not economical to produce a printing plate, it is possible to employ self-adhesive masks, for example. US 2009/0081378 A1 discloses coated lenses and a method for coating lenses. US 2014/0099439 A1 discloses a method for producing optical lenses.

SUMMARY

The disclosure is based on the object, therefore, of developing the method of the type mentioned above to the effect that the disadvantages mentioned are avoided. In particular, the intention is to make it possible to modify methods for producing a coating on a surface of a coated or an uncoated spectacle lens to the effect that the disadvantages associated with the production and use of a printing plate or a self-adhesive mask are avoided. In particular, the present disclosure is based on the object of being able to produce such spectacle lenses in small numbers cost-effectively and in a highly automated manner. Furthermore, this is intended to be made possible with recourse to already existing apparatuses.

Therefore, a method for producing a coating on a surface of a coated or uncoated spectacle lens is provided, comprising the following steps:
  applying at least one masking on at least one partial region of at least one surface of the coated or uncoated spectacle lens;
  applying at least one layer on the at least one surface of the coated or uncoated spectacle lens and on the at least one masking; and
  removing the at least one masking and the at least one layer applied on the at least one masking from the at least one partial region of the at least one surface, of the coated or uncoated spectacle lens,
wherein applying the at least one masking is carried out by means of a matrix printing method. Typically, a proportion of that partial region of at least one surface of the coated or uncoated spectacle lens which is provided with at least one masking is 20% or less relative to the entire at least one surface of the finished, edged spectacle lens that is provided with at least one masking.

Exemplary embodiments of the method according to the disclosure are specified below.

In the context of this disclosure, the at least one masking is applied either directly on at least one surface of the uncoated spectacle lens or directly on the outer layer— respectively on the object side or on the eye side—of the at least one coating of the coated spectacle lens. Hereinafter, in both cases mentioned above, reference is made to applying the at least one masking on at least one surface of the spectacle lens. Furthermore, in the context of this disclosure, the at least one layer is applied either directly on at least one surface of the uncoated spectacle lens or directly on the outer layer—respectively on the object side or on the eye side—of the at least one coating of the coated spectacle lens, in each case provided that the at least one layer is not applied on the at least one masking.

Furthermore, a coated or uncoated spectacle lens produced by the method according to the disclosure is provided.

Additionally, a coated or uncoated spectacle lens is provided, comprising at least one masking of at least one partial region of at least one surface of the coated or uncoated spectacle lens, wherein a boundary line between the partial region provided with at least one masking and an unmasked partial region is defined by a matrix printing method, wherein the boundary line typically has a pixel structure. Typically, a proportion of that partial region of at least one surface of the coated or uncoated spectacle lens which is provided with at least one masking is 20% or less relative to the entire at least one surface of the finished, edged spectacle lens that is provided with at least one masking.

Furthermore, a coated or uncoated spectacle lens is provided, comprising one layer, or a plurality of layers, applied only on at least one partial region of at least one surface of the coated or uncoated spectacle lens, wherein a boundary line between the partial region and an adjoining partial region, which in particular is not provided with the layer or the layers, is defined by a matrix printing method, wherein the boundary line typically has a pixel structure. Typically, the one layer, or the plurality of layers, applied only on a partial region of the spectacle lens, define at least one reflection image, wherein a proportion of that partial region of at least one surface of the coated or uncoated spectacle lens which is provided with at least one reflection image is 20% or less relative to the entire at least one surface of the finished, edged spectacle lens that is provided with at least one reflection image.

Exemplary embodiments of the spectacle lens are specified below.

Furthermore, the present disclosure relates to the use of a matrix printer for applying at least one masking on at least one partial region of at least one surface of a coated or uncoated spectacle lens. Typically, a proportion of that partial region of at least one surface of the coated or uncoated spectacle lens which is provided with at least one masking is 20% or less relative to the entire at least one surface of the finished, edged spectacle lens that is provided with at least one masking.

The method disclosed herein for producing a coating on at least one surface of a coated or uncoated spectacle lens makes it possible to represent at least one reflection image on at least one surface of a spectacle lens with recourse to already known methods and apparatuses. This is done using conventional matrix printers which produce the at least one masking by composing individual small dots or pixels. As a result, any desired text and/or any desired graphic can be applied on at least one partial region of at least one surface of the coated or uncoated spectacle lens as at least one masking. If at least one further layer, for example an antireflection layer, a portion of the layers of an antireflection layer, a reflection layer or a portion of the layers of a reflection layer, is then applied on the same at least one surface and afterward the at least one masking together with—present thereon—the at least one layer, in particular an antireflection layer, a portion of the layers of an antireflection layer, a reflection layer or a portion of the layers of a reflection layer, is removed from the at least one partial region of the at least one surface, the at least one further layer remains only in the unmasked region of the surface. Consequently, the at least one masking defines at least one reflection image on at least one surface of the coated or uncoated spectacle lens, wherein the reflection image has different, detectable reflection properties. The present method can thus be used for the targeted production of defined multicolored reflection images on at least one surface of a spectacle lens. This is advantageous for aesthetic purposes, inter alia, e.g., for images on reflectively coated spectacle lenses for sunglasses, but also for the communication of information by, e.g., a company logo.

In contrast to impact printing methods, the technique used in a matrix printing method that is typically to be used according to the disclosure is implemented without contact, that is to say that the print head does not touch the at least one surface of the coated or uncoated spectacle lens. Exemplary matrix printers comprise laser printers, thermal printers and inkjet printers. One advantage of these non-contact matrix printing methods is that the at least one surface of the coated or uncoated spectacle lens is not subjected to mechanical loading, as would be the case for example for an impact printing method, for printing by means of a printing plate or applying a self-adhesive mask. Mechanical damage to that surface of the coated or uncoated spectacle lens which is to be provided with at least one masking is thus avoided. Furthermore, in the matrix printing method it is possible to provide virtually any desired resolutions, limited only by the printing method itself, as a result of which the realization of detailed reflection images is also made possible in a straightforward way. Finally, it has been found that in layer adhesion tests, such as e.g., a weathering test or a boiling test, the spectacle lenses according to the disclosure achieve results comparable to or at least not worse than areally coated spectacle lenses, i.e., spectacle lenses in which the coating was not interrupted by means of at least one masking according to the method according to the disclosure.

The method according to the disclosure can use any type of layer and number of layers as at least one layer. It is clear that, in this case, conventional layers, such as, an antireflection layer, a reflection layer, a clean-coat layer, an anti-fog coating or an electrically conductive or electrically semi-conducting layer, can also be applied on the at least one surface of a coated or uncoated spectacle lens, which cover the surface in its entirety. By way of example, three layers can be applied progressively on the coated or uncoated spectacle lens, wherein only the first, second, or third layer is also applied on at least one masking. Alternatively, the first and third layers, or the second and third layers, can also be applied on at least one masking. In one exemplary embodiment, all three layers are also applied on at least one masking. It is clear that these three layers can each have different chemical compositions and thus different optical properties.

The production of a plurality of layers of an antireflection layer and/or a plurality of layers of a reflection layer typically comprising a Bragg mirror, e.g., 2 to 13 layers of this type, 3 to 9 layers of this type, 4 to 8 layers of this type, 5 to 7 layers of this type, or 6 layers of this type, using the method according to the disclosure, makes it possible to create reflection images having a plurality of colors. The layers have different reflection maxima with respect to the exposure wavelength in line with their chemical composition. Consequently, layers of this type generate different reflection colors. Omitting one or more of these layers in at least one partial region of at least one surface of a coated or uncoated spectacle lens thus gives rise to reflection images having different colors or color effects. By way of example, by correspondingly carrying out the method according to the disclosure, it is possible to obtain a spectacle lens which comprises an antireflection layer consisting of only a single layer in at least one partial region of at least one surface of the spectacle lens, and an antireflection layer consisting of a plurality of layers in a different partial region of the same surface of the spectacle lens. An antireflection layer consisting of only a single layer and an antireflection layer consisting of a plurality of layers each provide different reflection colors (e.g., in the visible wavelength range), as a result of which a reflection image having different colors is obtained.

The reflection image can be for example a pattern, such as a logo, letter, or lettering. By way of example, the pattern can also be at least one decoration or at least one aesthetic element. Optionally, the at least one decoration or the at least one aesthetic element can complete a decoration or an aesthetic element of the spectacle frame on at least one surface of the spectacle lens. Typically, the reflection image provides an information content, e.g., the company name and/or data about the lens blank, the spectacle lens semi-finished product, or the finished spectacle lens. Such information can be applied typically in the form of a 2D code, more typically a data matrix code, on at least one surface of the coated or uncoated spectacle lens. In this case, it is normally not desirable for a reflection image produced in this way to be in the visible range; it is therefore typically produced in the non-visible range, e.g., the short-wave range. Layers of this type are well known to the person skilled in the art. For different layers produced according to the method according to the disclosure, the pattern can be identical, in particular congruent, or different. Consequently, by way of example, a three-dimensional barcode can also be produced by means of corresponding combination of layers at specific surface regions of the coated or uncoated spectacle lens. The three-dimensional barcode can provide information in a depth-modulated manner, as a result of which a higher information density can be achieved in comparison with a data matrix code, for example.

A reflection image is an image which is brought about on account of differences in the reflection properties of two regions of at least one surface of a coated or uncoated spectacle lens. The regions are, in particular, firstly that partial region of at least one surface which is provided with at least one masking or was formerly provided with at least one masking, typically that partial region of at least one surface which was formerly provided with at least one masking, and secondly the same remaining surface of the coated or uncoated spectacle lens. By way of example, in that partial region of at least one surface which was formerly provided with at least one masking, no antireflection layer or an antireflection layer having fewer layers than on the same remaining surface of the spectacle lens may be present. General differences, i.e., differences present for the entire visible spectral range, in the reflectance or in particular wavelength-specific differences in the reflectance may bring about for an observer a visible reflection image which is also contrasted in terms of color in the case of wavelength-specific behavior. The differences in the reflection properties may make the reflection image visible to the human eye for example also only under specific light conditions and/or viewing angles.

The structure of the at least one masking that is obtained by means of the matrix printing method and the obtained structure of the coating applied on the at least one masking can readily be determined by suitable analysis methods. By way of example, individual dots/pixels of the at least one masking applied can be resolved and identified by means of customary light microscopy. This also applies to the layer applied on the at least one masking after the masking has typically been removed, since at the boundary line between the partial region provided with at least one masking and the unmasked partial region of at least one surface, typically of the same surface, of the coated or uncoated spectacle lens, the pixel structure obtained by means of the matrix printing method is reflected in the edge region, or the boundary line of the applied layer. The layer applied on the same surface likewise has a pixel structure, which is present in a mirror-reversed or inverted fashion with respect to the at least one masking produced by means of the matrix printing method at the boundary line. In this respect, the coated or uncoated spectacle lens according to the disclosure receives, as a result of the matrix printing method, an identifiable structural property which is not inherent to an impact printing method, for example.

The removal of the at least one masking is known to the person skilled in the art and is based on the matrix printing method chosen and/or the printing material used in the matrix printing method. If the matrix printing method is an inkjet printing method, for example, the at least one masking can be removed by means of a solvent, for example an organic solvent, which selectively removes the masking. In this case, the solvent is either chosen such that the surface of an uncoated spectacle lens or a layer present on a coated spectacle lens is not attacked by the solvent. Alternatively, the solvent is typically applied selectively, that is to say only in that partial region of the at least one surface of the coated or uncoated spectacle lens which is provided with at least one masking. In this case, the at least one masking is typically removed by a solvent, e.g., an organic solvent, such as acetone, butanone, ethanol and/or isopropanol, for example. Typically, the at least one masking is removed by acetone or a solvent containing acetone. Particularly typically, the at least one masking and the at least one layer present thereon are removed by means of a cloth, typically by means of a cotton cloth, or by means of a brush, each of which is impregnated with at least one organic solvent, typically acetone and/or ethanol.

Alternatively, the removal can also be effected by simple wiping away after contacting the at least one masking and the layer applied thereon with at least one solvent or a combination of wiping away, e.g., by means of a cotton cloth, and subsequent immersion of the spectacle lens in one of the solvents mentioned above. It is clear that one or more immersion steps (possibly using different solvents) can be combined possibly with one or more wiping-away steps in an arbitrary order. By way of example, the X-Cube Lens Digi-Speed printer from TECO, France, can be used as an inkjet printer. A printer from Notion Systems GmbH, Germany, can be used as a further suitable inkjet printer, wherein the print head Galaxy PH 256/80 with approximately 177.17 px/cm (450 dpi) and typically the Galaxy PH 256/30 with approximately 354.34 px/cm (900 dpi) (both Fujifilm Dimatix, USA) can be used as suitable print heads. Further suitable print heads include print heads of the Xaar 1000 series (from Xaar, Europe), e.g., the Xaar 1001, which can be operated for example with the Teco X-302 printer using the Tinte Teco T002 LED (UV-curing) (both from TECO, France).

A "matrix printing method," as used herein, concerns a non-contact printing method in which a printed-out pattern or a printed-out character is composed of individual pixels. In the context of the present application, the term "inkjet printing method" denotes a non-contact printing method in which a printed-out pattern or a printed-out character is composed of individual pixels made from ink. Non-contact printing methods of this type do not require a printing form, such as, a printing plate.

In the context of the present application, a "spectacle lens" concerns a spectacle lens in accordance with DIN EN ISO 13666:2013-10, section 8.1.2, namely an eyeglass worn in front of the eye, but not in contact with the eye, wherein an eyeglass is a lens that is intended to be used for measurement and/or correction of defective vision and/or for protection of the eye or for changing the appearance thereof.

The "spectacle lens" can be a lens blank, a spectacle lens semifinished product or a finished spectacle lens.

In accordance with section 8.4.1. of the EN ISO 13666:2012 standard, the term "lens blank" concerns a usually preformed piece of material for producing a lens in any state before the end of surface processing.

In accordance with section 8.4.2. of the EN ISO 13666:2012 standard, the term "spectacle lens semifinished product" concerns a lens blank having only one surface processed optically to completion.

In accordance with sections 8.4.6. to 8.4.8. of the EN ISO 13666:2012 standard, the term "finished spectacle lens" concerns a spectacle lens having two optical surfaces processed to completion. A spectacle lens before or after edge processing can be involved.

In the context of the present application, the "surface of the coated or uncoated spectacle lens" concerns the entire front surface or object-side surface of the coated or uncoated spectacle lens and/or the entire back surface or eye-side surface of the coated or uncoated spectacle lens. Otherwise, consideration is generally given to a "partial region of the surface" i.e., an areal proportion of less than 100% of the entire front surface or the object-side surface and/or the entire back surface or the eye-side surface in each case of the coated or uncoated spectacle lens. The "surface" can be the front surface and/or the back surface of the coated or uncoated spectacle lens.

The coating on the at least one surface of a coated or uncoated spectacle lens is effected either on the front surface or object-side surface or on the back surface or eye-side surface in each case of the coated or uncoated spectacle lens. In accordance with section 5.8 of the DIN EN ISO 13666:2012 standard, the term "front surface" or object-side surface denotes that surface of a spectacle lens which is intended to face away from the eye in the spectacles. In accordance with section 5.1.9 of the DIN EN ISO 13666:2012 standard, the term "back surface" or eye-side surface denotes that surface of a spectacle lens which is intended to face the eye in the spectacles. In one exemplary embodiment, the coating in accordance with the method according to the disclosure is effected on the front surface or object-side surface of a coated or uncoated spectacle lens.

In accordance with section 15.2 of the DIN EN ISO 13666:2012 standard, the term "spectral transmittance" or "transmission" denotes the ratio of the spectral radiation power transmitted by the respective material to the incident radiation power at a specific wavelength (k).

In accordance with section 15.4 of the DIN EN ISO 13666:2012 standard, the term "light transmittance" denotes the ratio of the luminous flux transmitted by the spectacle lens or filter or, in this case, by the coating to the incident luminous flux. Here, there is weighting with the sensitivity function of the human eye for daylight vision and the spectral radiation distribution of the CIE standard illuminant D65. Deviating from the aforementioned standard, it is possible here to take into account a wavelength range from 400 nm or 460 nm to 700 nm or 780 nm.

In the context of the present disclosure, the term "coating" may refer for example to an antireflection layer, a hard coating, an anti-fog layer, a clean-coat layer, an electrically conductive or electrically semiconducting layer, and/or a reflection layer. Typically, the method according to the disclosure is carried out using an antireflection layer and/or a reflection layer. If both an antireflection layer and a reflection layer are applied in accordance with the method according to the disclosure, it is typical for the reflection layer to be situated on the front surface and the antireflection layer on the back surface of the coated or uncoated spectacle lens. Alternatively, when applying an antireflection layer and a reflection layer in each case on the front surface of a coated or uncoated spectacle lens, at least one of these two layers can be applied in accordance with the method according to the disclosure, wherein typically the reflection layer constitutes the layer applied further toward the eye. If the method according to the disclosure is carried out only with the aid of the antireflection layer or only with the aid of the reflection layer, the antireflection layer is typically situated on the back surface and the reflection layer is typically situated on the front surface of a coated or uncoated spectacle lens.

The reflection layer can be embodied as a dielectric coating having a layer sequence of high refractive index and low refractive index layers. Such a dielectric mirror or filter can also be referred to as Bragg reflector. Optionally, such a coating may also have medium refractive index layers having a refractive index that lies between the refractive indices of high refractive index and low refractive index layers. Alternatively, the reflection layer can comprise at least one semitransparent metal layer. The at least one semitransparent metal layer can comprise in this case, for example, an aluminum layer, chromium layer, gold layer, and/or silver layer. The layer thickness of the semitransparent metal layer is typically in a range of 4 nm to 48 nm, particularly typically in a range of 8 nm to 41 nm and very particularly typically in a range from 17 nm to 33 nm. Reflection layers are known, e.g., from EP 2 685 306 A1. Typically, vacuum coating methods are used for applying the reflection layer, for example by evaporation or vapor deposition, sputtering or cathode sputtering or chemical vapor deposition. A box coater can be used for layer production. Suitable box coaters include for example the box coaters of the Syrus series from Baler Leybold Optics GmbH, Germany. The reflection layer is typically situated on the front surface of a coated or uncoated spectacle lens.

The layers of a coated or uncoated spectacle lens or at least one or more further layers present after the removal of the at least one masking on at least one part of the surface of the coated or uncoated spectacle lens can comprise any spectacle lens coatings. Examples thereof are a hard coating, antireflection layer or antireflective coating, dirt-repelling coating, hydrophobic coating, hydrophilic coating, anti-fog coating, antistatic coating, electrically conductive or electrically semiconducting layer, clean-coat layer, and reflection layer. In one exemplary embodiment of the disclosure, the at least one layer applied according to the method according to the disclosure on the at least one masking and on that partial region of the same surface of the coated or uncoated spectacle lens which is not provided with the at least one masking comprises at least one antireflection layer or at least one reflection layer. In this case, both the antireflection layer and the reflection layer can comprise at least one layer. In this exemplary embodiment, the antireflection layer typically comprises a plurality of layers, as described above. In this exemplary embodiment, the reflection layer typically comprises at least one semitransparent metal layer, typically composed of or comprising aluminum, chromium, gold, and/or silver.

In accordance with section 16 of the EN ISO 13666:2012 standard, a coated spectacle lens is a spectacle lens on which one or more surface coatings have been applied in order to change one or more of its properties. A hard coating is a coating that is intended to improve the abrasion resistance of the surface of a spectacle lens composed of organic material during normal use. An antireflection layer is a coating on the surface of a spectacle lens that is intended to reduce the proportion of light reflected from the surface of the spectacle lens. A dirt-repelling coating is a coating that is intended to reduce the adhesion of dust and/or grease and/or to simplify cleaning. A hydrophobic coating is a coating on the surface of a spectacle lens that is intended to result in drops of water beading away. A hydrophilic coating is a coating on the surface of a spectacle lens which is intended to enable very good saturation in order that drops of water spread on it and coalesce into a uniform film on the surface. An anti-fog coating is a hydrophobic or hydrophilic coating on the surface of a spectacle lens which is intended to reduce the fogging of the spectacle lens surface which arises as a result of drops or condensed water vapor if a relatively cold spectacle lens is introduced into a warmer, humid environment. An electrically conductive or electrically semiconducting coating is a coating which serves to transmit energy and/or information. One special form of an electrically conductive coating is an antistatic coating. An antistatic coating is a coating which is intended to reduce the static charge on a spectacle lens surface such that dust is not attracted, wherein the antistatic coating can be a separate layer or can be combined with any of the other coatings mentioned above. A clean-coat layer typically comprises a material having oleophobic and hydrophobic properties, as disclosed in EP 1 392 613 A1, for example, on which water forms a contact angle of more than 90°, typically of more than 100°, and particularly typically more than 110°. The clean-coat layer typically comprises an organofluorine layer in accordance with DE 198 48 591 A1, claim 1, or a layer based on perfluoropolyethers.

A reflection layer concerns a reflective layer that provides a constructive interference of the incident light, typically of the incident light in the visible wavelength range. In contrast to the antireflection layer, whose reflection reduction is achieved by destructive interference, the reflection can be brought about by constructive interference. Different reflection colors of the respective layer can be achieved by means of different thicknesses of the interference layers. The reflection effect—the intensity of the reflection that is to be perceived by an observer—is dependent, inter alia, on the basic tint of the spectacle lens.

The object on which the disclosure is based is achieved completely.

In accordance with one exemplary embodiment of the present disclosure, the at least one layer applied on the at least one masking and on that partial region of the same surface which is not provided with at least one masking is an antireflection layer or a reflection layer. In accordance with this exemplary embodiment, the antireflection layer comprises a plurality of layers, as already explained above. Furthermore, in accordance with this exemplary embodiment, the reflection layer comprises at least one semitransparent metal layer, typically comprising at least one layer composed of or comprising aluminum, gold, chromium, tungsten, tantalum, and/or silver, particularly typically composed of or comprising aluminum, gold, and/or silver. The antireflection layer here acts in the range of visible light, of non-visible light, or partly in the range of visible light. Suitable antireflection layers are known to the person skilled in the art and can be gleaned e.g., from EP 2 437 084 A1, EP 2 437 085 A1 and DE 10 2013 208 310 A1. In accordance with this exemplary embodiment, the method according to the disclosure can be carried out using an antireflection layer either on the front surface and/or on the back surface of a coated or uncoated spectacle lens. Typically, the front surface of a coated or uncoated spectacle lens is used for the method according to the disclosure using an antireflection layer. In this exemplary embodiment, the antireflection layer typically comprises a metal oxide, metal hydroxide, and/or metal oxide hydrate layer comprising or consisting of silicon, which typically forms the outermost layer of the antireflection layer. In this context, outermost layer is understood to mean that layer of the antireflection layer which is situated furthest to the eye side or furthest to the object side on the coated or uncoated spectacle lens.

Furthermore, in accordance with this exemplary embodiment, the front surface of a coated or uncoated spectacle lens is used for the method according to the disclosure using a reflection layer. In this exemplary embodiment, the antireflection layer can typically comprise a metal oxide, metal hydroxide, and/or metal oxide hydrate layer comprising or consisting of silicon, which typically forms the outermost layer of the antireflection layer; wherein in this context, outermost layer is understood to mean that layer of the antireflection layer which is situated furthest to the eye side or furthest to the object side on the coated or uncoated spectacle lens.

The materials $TiO_2$, $SiO_2$, and $Al_2O_3$ are traditional materials for producing optical layer systems. In particular, $TiO_2$ as high refractive index material and $SiO_2$ as low refractive index material, on account of their high degree of transparency, are used for producing antireflection layers of spectacle lenses. Individually, these layers act like customary oxidic layers without a significant conductivity. The antireflection layer can comprise at least one electrically conductive or electrically semiconducting layer, for example a layer comprising or consisting of indium tin oxide ($(In_2O_3)_{0.9}(SnO_2)_{0.1}$; ITO), fluorine tin oxide ($SnO_2$:F; FTO), aluminum zinc oxide (ZnO:Al; AZO), and/or antimony tin oxide ($SnO_2$:Sb; ATO), typically a layer composed of or comprising ITO and/or composed of or comprising FTO. Particularly in the case of uncoated plastic spectacle lenses, the antireflection layer is not applied directly on at least one surface of the spectacle lens, rather a hard coating is provided between the uncoated plastic spectacle lens and the antireflection layer. As already mentioned above, the antireflection layer can comprise a plurality of layers, such as 2 to 13 layers. In this case, the surface includes the front surface and/or the back surface of the coated or uncoated spectacle lens. Between the individual layers of an antireflection layer which are produced according to the method according to the disclosure, one or more layers of an antireflection layer which completely cover the at least one surface of the coated or uncoated spectacle lens can be present. Consequently, both surfaces of the coated or uncoated spectacle lens can be provided with any desired layer sequence. It is clear that a reflection image is visible in the antireflection layer only sometimes, under specific light conditions and angles.

In one exemplary embodiment of the disclosure, the antireflection layer can have a monolayer or multilayered construction, wherein at least one layer of the antireflection layer is produced according to the disclosure. Typically, a two-, three-, four-, five-, or six-layered construction is chosen for an antireflection layer. In the case of antireflection layers having a two- or multilayered construction, a layer sequence in which a layer having a low refractive index is adjoined by a layer having a high refractive index is typical. In other words, for such a multilayered construction it is expedient for layers having a low refractive index and layers having a high refractive index to alternate by turns. In addition, provision can be made of further layers, for example adhesion layers (e.g., having a thickness in a range of approximately 5 nm to 5 μm), which need not have an optical function, but which can be advantageous for the durability, adhesion properties, resistance to climatic conditions, etc. By way of example, it is also possible to replace the above antireflection layer by a reflection layer comprising one or more layers, for example, or to provide both an antireflection layer on the back surface and a reflection layer on the front surface of a coated or uncoated spectacle lens. In the latter case, the method according to the disclosure can be carried out with the aid of only the antireflection layer, with the aid of only the reflection layer or with the aid of the antireflection layer and the reflection layer. If an antireflection layer and a reflection layer are present simultaneously, for carrying out the method according to the disclosure with the aid of the antireflection layer it is typical if the reflection layer makes it possible to identify at least one reflection image also on the back surface of a coated or uncoated spectacle lens.

Examples of suitable materials for such antireflection layer and/or reflection layer layers are silicon or boron, but also oxides, fluorides, silicides, borides, carbides, nitrides, and sulfides of metals and non-metals. For coating, these substances can be used individually or as a mixture of two or more of these materials.

In particular, suitable materials for producing an antireflection layer are SiO, $SiO_2$, $ZrO_2$, $Al_2O_3$, TiO, $TiO_2$, $Ti_2O_3$, $Ti_3O_4$, $Ti_3O_5$, $CrO_x$ (where x=1-3), $Cr_2O_3$, $Y_2O_3$, $Yb_2O_3$, MgO, $Nb_2O_5$, $Ta_2O_5$, $CeO_2$, and $HfO_2$ etc. or corresponding mixed oxides, the materials $MgF_2$, $AlF_3$, $BaF_2$, $CaF_2$, $Na_3AlF_6$, and $Na_5Al_3Fi_4$, and, for producing a reflection layer comprising at least one semitransparent metal layer, the metals Cr, W, Ta, Ag, and Au. Given suitable combination and/or layer thicknesses, optionally using at least one of the metals mentioned above, materials mentioned above for producing an antireflection layer can also be used for producing a reflection layer (Bragg mirror).

Coatings, in particular an antireflection layer or a reflection layer, can be applied by customary methods, wherein preference is given to producing the individual layers by means of vapor deposition, sputtering, CVD (Chemical Vapor Deposition), and/or PVD (Physical Vapor Deposition)—in particular by means of plasma-enhanced PVD methods. Particular preference is given to applying an antireflection layer by means of deposition from a vapor phase, such that a densified layer having a high abrasion resistance is formed. A box coater can be used for layer production by means of PVD methods. Suitable box coaters include the box coaters of the Syrus series from Baler Leybold Optics GmbH, Germany, for example.

The total layer thickness dA of an antireflection layer having a single- or multilayered construction is not subject to any particular limitation, in principle. However, the total layer thickness dA is typically set to dA≤2000 nm, more typically dA≤1500 nm, and particularly typically dA≤500 nm. However, the minimum total layer thickness dAm of the antireflection layer is as far as possible approximately dAm≥100 nm. With particularity, the antireflection layer has a total layer thickness from a range of 97 nm to 2000 nm, typically from a range of 112 nm to 1600 nm, more typically from a range of 121 nm to 1110 nm, particularly typically from a range of 132 nm to 760 nm, and very particularly typically from a range of 139 nm to 496 nm. Total layer thicknesses of the antireflection layer as indicated above relate in each case to the antireflection layer on that part of the surface of the coated or uncoated spectacle lens which was not interrupted by at least one masking in accordance with the method according to the disclosure.

By way of example, such an antireflection layer can be constructed from alternating high and low refractive index layers composed of $TiO_2$ and $SiO_2$, respectively, where for example $\lambda/8$-$TiO_2$, $\lambda/8$-$SiO_2$, $\lambda/2$-$TiO_2$, and $\lambda/4$-$SiO_2$, wherein the layer thickness indicated here is typically related to the wavelength λ=550 nm. Such an antireflection layer having a multilayer construction is typically produced by means of known PVD methods.

Given a suitable choice of layer sequences having different refractive indices, a reflective effect can also be achieved. In this case, the reflection layer is formed by an interference coating whose effect is based on constructive interference. In this regard, as a result of the locally targeted layer sequence of optically effective layers having different refractive indices, both a reduction (antireflection) and an intensification (reflection) of the light reflection of the spectacle lens can be achieved. It goes without saying that even further layers, for example an anti-scratch protective layer or an electrically conductive and/or antistatic layer in order to achieve an antistatic effect, can be applied on at least one surface of a coated or uncoated spectacle lens. In particular, additional layers can also be inserted within a layer sequence of the exemplary embodiments specified in the subsequent description in order to obtain additional functionalities. By way of example, the insertion of an ITO layer with a thickness of approximately 3 nm within a layer sequence specified in the subsequent description can achieve an antistatic effect, without having a significant influence on the spectral reflectivity. Here, it may be advantageous to insert the ITO layer not as a termination layer but within the layer sequence. Alternatively or additionally, it is possible to use a $TiO_x$ layer where x<2. It goes without saying that there is an interaction between the layers of the coating, and so it is not possible to undertake a breakdown, but instead the entire effect of the coating should be taken into account in respect of the optical properties, in particular in respect of the angle-dependent reflectivity.

One exemplary coating comprises, directly on at least one surface of a coated or uncoated spectacle lens, a ZrO layer, followed by five to twelve layers selected from $SiO_2$, $Ti_3O_5$, ITO, and ZrO. One typical layer sequence composed of precisely these layers comprises, directly on at least one surface of a coated or uncoated spectacle lens, an (a) ZrO layer, followed by a (b) $SiO_2$ layer, (c) ITO layer or ZrO layer, (d) ZrO layer or ITO layer (thus the respective other layer in regard to point (c)), (e) ZrO layer or $Ti_3O_5$ layer, (f) ZrO layer or $Ti_3O_5$ layer, and (g) $SiO_2$ layer. These layers each have layer thicknesses in the range of 2 nm to 150 nm, typically 5 nm to 100 nm. More typically, the one or a plurality of ITO layer(s) each has (have) a layer thickness of between 2 nm and 8 nm, wherein the remaining layers each have a layer thickness of between 10 nm and 90 nm.

In accordance with a further exemplary embodiment of the present disclosure, the matrix printing method is an inkjet printing method. In the case of an inkjet printer, the printed image is produced without contact by means of the targeted positioning or the deflection of small droplets of ink. The inkjet printer can be a continuous inkjet printer or a drop on demand printer. The inkjet ink typically comprises at least one solvent and/or at least one radiation-curable component and/or at least one binder and at least one colorant and optionally at least one additive. A solvent-based inkjet ink and/or a water-based inkjet ink typically comprise(s) a solvent proportion from a range of 10% by weight to 95% by weight, particularly typically from a range of 20% by weight to 94% by weight, and very particularly typically from a range of 50% by weight to 93% by weight, in each case relative to the total weight of the inkjet ink. The evaporation number of the solvent relative to ether at 20° C. here is typically in a range of 10 to 300, particularly typically in a range of 20 to 250, and very particularly typically in a range of 80 to 200. The at least one solvent used in an inkjet ink, used in accordance with drop on demand technology, typically has a flash point of at least 61° C. A radiation-curable inkjet ink typically used for applying the at least one masking, in particular an inkjet ink that is curable by means of UV light, typically comprises a solvent proportion from a range of 0% by weight to 50% by weight, particularly typically from a range of 0% by weight to 10% by weight, in each case relative to the total weight of the radiation-curable inkjet ink. The radiation-curable component of the radiation-curable inkjet ink typically simultaneously acts as a binder. Typically, the proportion of radiation-curable component, e.g., liquid oligomers and monomers, is in a range of 1% by weight to 99% by weight, particularly typically in a range of 30% by weight to 80% by weight, and particularly typically in a range of 40% by weight to 75% by weight, in each case relative to the total weight of the inkjet ink.

The radiation-curable inkjet ink furthermore typically comprises at least one photoinitiator, which can be present in a manner dissolved in the radiation-curable component or as a solid. In a further exemplary embodiment, the inkjet ink can be present not in liquid form but rather in solid form, for example as a small block of wax, and not be melted until in the ink system. In this case, ink system is understood to mean the entire supply of the inkjet printer, such as reservoirs, hoses, channels or valves. Meltable inkjet inks of this type are referred to as "phase change" inks. In the inkjet ink that is usable for applying the at least one masking, examples of colorants used may be various black colorants, such as e.g., C.I. Solvent Blacks 27, 28, 29, 35, 45, C.I. Pigment Black 7; various blue colorants, such as e.g., C.I. Solvent Blues 25, 44, 48, 67, 70, C.I. Pigment Blue 15:3, various red colorants, such as e.g., C.I. Acid Red 60, C.I. Pigment Red 122 and/or various yellow colorants, such as e.g., C.I. Acid Yellow 23, C.I. Direct Yellow 86, C.I. Direct Yellow 132, C.I. Disperse Yellow 119, C.I. Reactive Yellow 37, C.I. Solvent Yellow 162, C.I. Solvent Yellow 146, C.I. Pigment Yellow 17, C.I. Pigment Yellow 86, and C.I. Pigment Yellow 155. As additives, the inkjet ink can comprise for example dispersants, anti-settling agents, humectants, wetting agents, biocides, pH adjusters, plasticizers, and/or UV protective agents. The pH of the inkjet ink here is normally between 6 and 9, and the viscosity is 30 to 60 Pa·s for a bubble-jet printer or 30 to 35 Pa·s for a piezoelectric printer. The surface tension is 1 to 5 cP for a bubble-jet printer and 10 to 20 cP for a piezoelectric printer.

In accordance with one exemplary embodiment of the present disclosure, the at least one layer to be applied on the at least one masking is a first layer, wherein at least one second layer is applied before the step of applying the at least one masking on at least one surface of the coated or uncoated spectacle lens and/or after the step of removing the at least one masking from the partial region of the same surface. Any layer of the type mentioned in the introduction can be used here.

In accordance with a further exemplary embodiment of the present disclosure, the step of removing the at least one masking from the partial region of at least one surface of the coated or uncoated spectacle lens comprises wiping away the masking and/or dipping the coated or uncoated spectacle lens into a solvent, wherein the solvent typically comprises acetone. The wiping away can be effected for example by means of a suitable cloth composed of a suitable material known to the person skilled in the art, e.g., cotton. Alternatively, the removing can be effected by brushing, e.g., by means of a brush washing installation. As an alternative or in addition to wiping away, removing the at least one masking from the partial region of the surface of the coated or uncoated spectacle lens, including the layer present on the masking, can be effected by means of a solvent that typically contains acetone. By way of example, acetone, a mixture of water and acetone or a mixture of ethanol and acetone can be used as a solvent suitable for removing at least one masking produced by means of an inkjet printing method. Mixtures mentioned above can contain acetone in an amount of between 10 and 70% by weight, with the remainder being either water or ethanol. It is likewise conceivable to use acetone or ethanol. The solvent is chosen in such a way that only the at least one masking is attacked and removed together with the at least one layer applied thereon. The coated or uncoated spectacle lens and further layers possibly present are typically not attacked by the solvent. Alternatively, the solvent is applied selectively on the partial region of the at least one surface of the coated or uncoated spectacle lens in order to remove the masking there. What can be ensured in this way, for example, is that, in the case of a coated or uncoated spectacle lens, only the masking to be removed together with at least one layer present thereon, but not the spectacle lens or further layers of the spectacle lens, comes into contact with the solvent.

In accordance with a further exemplary embodiment of the present disclosure, the at least one layer to be applied on the at least one masking has a reflection maximum in the visible or in the non-visible spectral range. The terms visible and non-visible here relate to the spectral range that is visible and non-visible, respectively, to the human eye, for example 400 nm to 780 nm. A reflection maximum in the visible spectral range can be used for producing a reflection image that is visible to a third person, i.e., a person viewing the spectacle lens from the front side. A reflection maximum in the non-visible spectral range can be used for producing a non-visible reflection image. A non-visible reflection image of this type can contain information about the spectacle lens, e.g., it can be present in the form of a 2D code, typically a data matrix code. The read-out of the non-visible reflection image is governed by the reflection maximum (chosen) and can be visualized and evaluated by means of reflection measurement in the corresponding wavelength range.

In accordance with a further exemplary embodiment of the present disclosure, the coated or uncoated spectacle lens is a lens blank, a spectacle lens semifinished product, or a finished spectacle lens. As explained above, the lens blank is a usually preformed piece of material for producing a spectacle lens in any state before the end of surface processing. A spectacle lens semifinished product relates to a lens blank having only one surface processed optically to completion, whereas the finished spectacle lens has two optical surfaces processed to completion, before or after the edge processing.

In accordance with a further exemplary embodiment of the present disclosure, the proportion of that partial region of at least one surface of the coated or uncoated spectacle lens which is provided with at least one masking and/or with at least one reflection image is 20% or less, typically 0.05% to 17%, more typically 0.1% to 14%, particularly typically 0.3% to 9%, and very particularly typically 0.5% to 4%, in each case relative to the entire at least one surface of the finished, edged spectacle lens that is provided with at least one masking and/or is provided with at least one reflection image. By way of example, the proportion of that partial region of at least one surface which is provided with at least one masking and/or with at least one reflection image can be between 20% and 1% or between 10% and 1.5% or between 5% and 2%, or between 3% and 2%, in each case relative to the entire at least one surface of the finished, edged spectacle lens that is provided with at least one masking and/or is provided with at least one reflection image. The at least one masking of a comparatively small proportion of the at least one surface of 20% or less, relative to the entire at least one surface of the finished, edged spectacle lens that is provided with at least one masking and/or is provided with at least one reflection image, ensures that a desired coating and thus the desired functionality and no reflection image are present for the majority of the least one surface of the coated or uncoated spectacle lens. Values mentioned above apply to the entire at least one surface of the finished, edged spectacle lens that is provided with at least one masking and/or is provided with at least one reflection image, independently of whether only the front surface or only the back surface or the front surface and the back surface is/are provided with at least one masking and/or with at least one reflection image.

By way of example, as reflection image, a pattern, e.g., a logo, with a size of 0.3 cm×1.0 cm can be applied on at least one surface of a coated or uncoated spectacle lens with a size of 3 cm×5 cm. This reflection image then typically lies on at least one surface of the spectacle lens, but not within a circle having a radius of at least 7 mm, more typically of at least 11 mm, particularly typically of at least 13 mm, and very particularly typically of at least 19 mm, around the distance visual point of a single-vision spectacle lens or around the prism reference point of a multifocal spectacle lens/progressive spectacle lens.

In accordance with an exemplary embodiment of the present disclosure, the at least one masking is applied on at least one surface of the coated or uncoated spectacle lens by means of a matrix printing method, wherein the at least one masking is not applied within a circle having a radius of at least 6 mm, more typically of at least 9 mm, particularly typically of at least 12 mm, and very particularly typically of at least 16 mm, around the distance visual point of a single-vision spectacle lens or around the prism reference point of a multifocal spectacle lens/progressive spectacle lens on at least one surface of the coated or uncoated spectacle lens. Consequently, in accordance with this exemplary embodiment, no reflection image is situated within a circle having a radius mentioned above, independently of whether at least one reflection image was produced on the front surface or on the back surface or on the front surface and on the back surface of a coated or uncoated spectacle lens in accordance with the method according to the disclosure.

In accordance with a further exemplary embodiment of the present disclosure, that partial region of at least one surface of the coated or uncoated spectacle lens which is provided with at least one masking and/or with at least one reflection image is present in a circumferential edge region of the same surface, wherein a proportion of the circumferential edge region of the at least one surface is typically 10% or more, more typically 20% to 30%, in each case relative to the entire at least one surface of the finished, edged spectacle lens that is provided with at least one masking and/or with at least one reflection image. By way of example, the proportion of the circumferential edge region of the at least one surface is 10% or 20% to 70% or 15% to 60% or 20% to 50% or typically 20% to 30%, in each case relative to the entire at least one surface of the finished, edged spectacle lens that is provided with at least one masking and/or with at least one reflection image. The edge region is typically chosen in such a way that the edge region is at a constant distance from the boundary of the at least one surface. Restricting the at least one masking and/or the at least one reflection image to the edge region of at least one surface can ensure that only noncritical regions of the at least one surface, i.e., regions which do not disturb the user of the spectacle lens, have the reflection effect. Values mentioned above apply in each case to the front surface or to the back surface of a coated or uncoated spectacle lens. For the case where both the front surface and the back surface of the coated or uncoated spectacle lens have at least one masking and/or at least one reflection image in the edge region, values above relate separately to the front surface and to the back surface.

In accordance with a further exemplary embodiment of the present disclosure, that partial region of the at least one surface of a coated or uncoated spectacle lens which is provided with at least one masking and/or with at least one reflection image has the shape of a pattern, typically of a logo or of a letter, or of a negative of the logo or of the letter. A logo here should be understood as a graphical symbol or mark representing a specific subject, such as, for example, a company, an organization, a private person or a product. The logo here can consist of one or more letters or of a combination of letters and image elements. The pattern can likewise serve to depict properties characterizing the coated or uncoated spectacle lens. The pattern can reproduce information concerning the spectacle lens, for example, in the form of a 2D code, typically a data matrix code, or a part thereof. In comparison with the spectacle lens, the 2D code, typically data matrix code, or the marking symbol, has small dimensions of, for example, 5 mm by 5 mm or less. The marking symbol is not necessarily square, but rather can have any other shape, such as, for example, round, rectangular or triangular. The data matrix code is embodied in accordance with the standard DIN EN ISO 8980-2, section 7.1 for progressive spectacle lenses, namely as a permanent identification that is permanently identified at least with the following indications:

a) Marking for alignment; this must consist at least of two markings with a spacing of 34 mm and must be arranged symmetrically with respect to a vertical plane through the fitting point or the prism reference point;

b) Indication concerning the near additional power, in diopters; or c) Indication of the manufacturer or supplier or of the trade name or trademark.

The data matrix code can furthermore have a size of 2 mm by 2 mm and in this case is normally constructed from 16×16 dots. In this case, the requirement of the permanent identification is ensured by the fact that the at least one layer applied on the at least one masking in the method according to the disclosure is a permanently applied layer. The at least one layer can be permanently applied by means of the choice of a suitable material. Alternatively, after completion of the at least one layer, the latter can be covered with one or more further layers having a protective function. The marking symbol or the data matrix code can be detected by determining the changed light transmittance of the spectacle lens. In this context, it is likewise conceivable to provide a change in the light transmittance in the non-visible range, for example in the UV range. As a result, the marking symbol applied by means of the method according to the disclosure or the data matrix code produced by means of the method according to the disclosure within or on the at least one antireflection layer does not disturb the antireflection properties of the spectacle lens in the range of visible light and is not discernible to the naked eye.

In accordance with a further exemplary embodiment of the present disclosure, a resolution of the boundary line is 118 pixels/cm or more, typically 236 pixels/cm or more. By selecting a suitable resolution of the boundary line, it is possible to ensure for example a sharp imaging of the reflection image, for example of a pattern or of a marking symbol. Typically, for this purpose, use is made of high-resolution matrix printing methods having a resolution of the boundary line of 400 pixels/cm or more, such as, for example, 500 pixels/cm, 600 pixels/cm, 700 pixels/cm, or 800 pixels/cm.

In one exemplary embodiment of the disclosure, an anti-reflection layer comprises a plurality of layers.

In one exemplary embodiment of the disclosure, the antireflection layer comprises only a single layer. In this exemplary embodiment, the single layer of the antireflection layer comprises at least one metal oxide, metal hydroxide and/or metal oxide hydrate of silicon.

In the context of this disclosure, the terms layer and coating are used interchangeably.

In one exemplary embodiment of the disclosure, the method according to the disclosure can be used for spectacle lenses without a nominal dioptric power and correction spectacle lenses, that is to say spectacle lenses having a dioptric power. According to DIN EN ISO 13666, dioptric power is the collective term for the focusing and the prismatic power of a spectacle lens. In this case, the spectacle lens can be based on organic materials or on mineral glass. A spectacle lens based on organic materials is also referred to as a plastic spectacle lens. The spectacle lens can furthermore be colored or non-colored.

In one exemplary embodiment of the disclosure, the at least one masking is applied on a coated spectacle lens. In this exemplary embodiment, the coating is a hard coating and/or a layer of the antireflection layer. After applying the masking, at least one further layer of the antireflection layer, typically two to nine layers of the antireflection layer, particularly typically four to seven layers of the antireflection layer, is applied on the at least one masking and on the partial region of the same at least one surface of the coated or uncoated spectacle lens. After removing the at least one masking and the at least one layer situated on the masking, a spectacle lens comprising at least one reflection image is obtained. Optionally, the at least one surface of a coated or uncoated spectacle lens can be provided with at least one further layer of an antireflection layer and/or with at least one anti-fog layer and/or with at least one clean-coat layer.

In one exemplary embodiment of the disclosure, at least one electrically conductive or electrically semiconducting layer can be applied on that surface of a coated or uncoated spectacle lens which is provided with at least one masking.

After removing the at least one masking and the at least one electrically conductive or electrically semiconducting layer present thereon and, if appropriate, after applying further layers, a spectacle lens is obtained which can comprise a reflection image and/or an electrically conductive or electrically semiconducting layer that is structured, depending on the masking used. This structured electrically conductive or electrically semiconducting layer can be embodied as a conductor track for power supply or control of further components of spectacles. If appropriate, at least one insulating layer can be applied on the structured electrically conductive or electrically semiconducting layer, and subsequently at least one masking and at least one further electrically conductive or electrically semiconducting layer can be applied on the at least one insulating layer. After removing the at least one masking and the at least one electrically conductive or electrically semiconducting layer present thereon and optionally after repeating the steps presented above, it is possible, by structuring a plurality of electrically conductive or electrically semiconducting layers, separated in each case by at least one insulating layer, to generate multilayered conductor track systems comparable to a multilayer PCB (printed circuit board). If necessary, a through contact ("via") between the conductor track layers is also possible here by means of suitable masking of the insulating layers.

Further advantages are evident from the description and the accompanying drawings.

It goes without saying that the aforementioned features and the features yet to be explained below can be used not only in the respectively specified combination but also in other combinations or on their own, without departing from the scope of the present disclosure.

BRIEF DESCRIPTION OF THE DRAWINGS

The disclosure will now be described with reference to the drawings wherein.

DESCRIPTION OF EXEMPLARY EMBODIMENTS

Hereinafter, the spectacle lens 10 is a spectacle lens semifinished product or a finished spectacle lens before or after edge processing.

Figure 1:
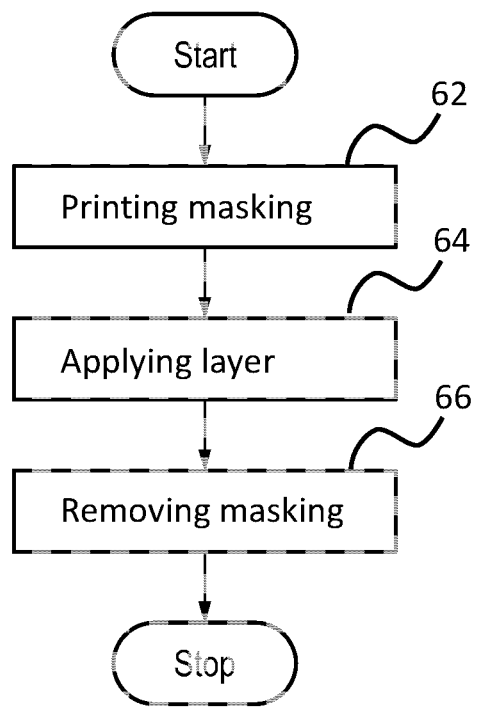
FIG. 1 shows a flow diagram of method steps of a method for producing a coating on a surface of an uncoated or coated spectacle lens.

FIG. 1 shows a flow diagram of a method of producing a coating on a surface 14 of a coated or uncoated spectacle lens 10. In a first step 62, the at least one masking of at least one partial region of at least one surface of the coated or uncoated spectacle lens is carried out by means of a conventional inkjet printing method. In step 64, a layer is applied on the at least one masking and on that partial region of the same surface of the coated or uncoated spectacle lens 10 which is not provided with at least one masking, in such a way that the entire surface is covered. A further step 66 involves removing the inkjet ink applied as at least one masking from the partial region of the surface by immersion in acetone, followed by wiping away using a cotton cloth and renewed wiping away using a cotton cloth impregnated with acetone. This ensures that the layer applied in step 64 is present only on the non-masked partial regions of the surface of the coated or uncoated spectacle lens 10. Consequently, the spectacle lens 10 obtained as a result has a different light transmittance and reflectance over the surface of the spectacle lens 10 that is processed in steps 62 to 66.

Figure 2:
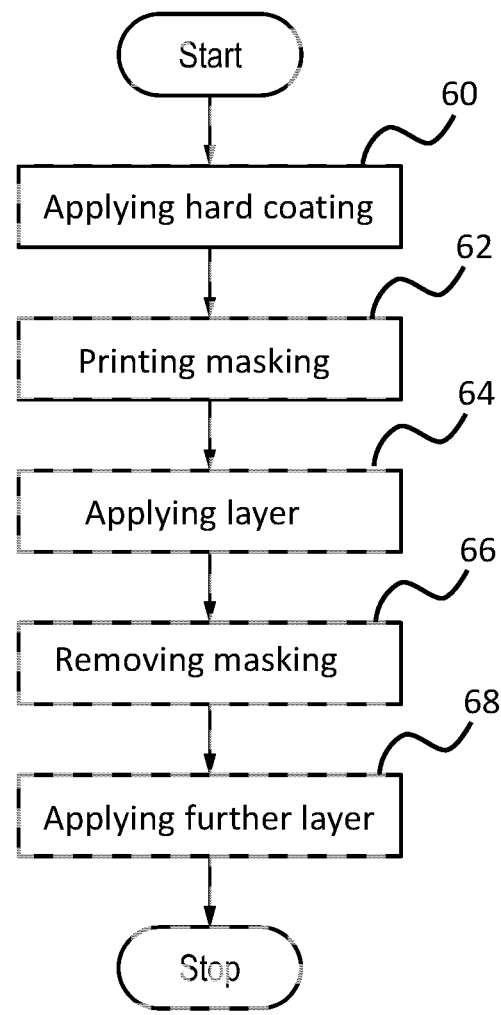
FIG. 2 shows a flow diagram of method steps of an alternative method for producing a coating on a surface of a coated or uncoated spectacle lens.

FIG. 2 shows a further flow diagram of a method for producing a coating on a surface 14 of a coated or uncoated spectacle lens 10. In a first step 60, a hard coating is applied on at least one surface of the spectacle lens 10. Steps 62, 64, and 66 that then follow correspond to steps 62, 64, and 66 mentioned above, with reference to FIG. 1. In a further step 68, a further layer completely covering the same surface is subsequently applied on the first layer, which only partly covers this surface of the spectacle lens 10. The further and the first layer are typically part of an antireflection layer. In this case, the first layer has a reflection maximum in the visible spectral range that is different than the reflection maximum of the further layer, which is likewise present in the visible spectral range. A reflection image determined by the two different reflection maxima in the visible range is thus produced.

Figure 3:
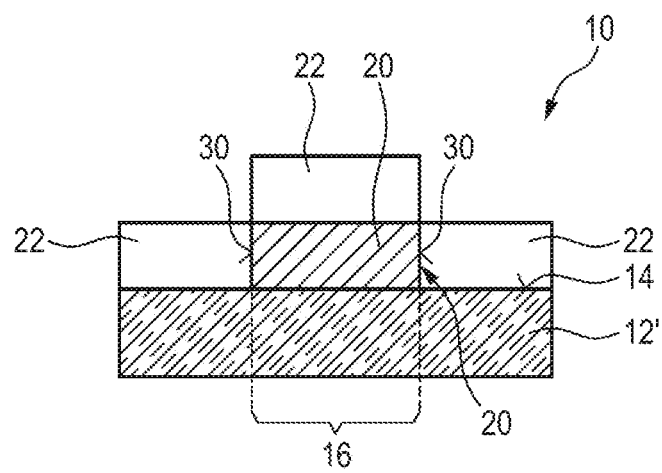
FIG. 3 shows an uncoated spectacle lens with masking and a layer applied thereabove.

FIG. 3 shows a spectacle lens 10 modified by the method according to the disclosure. The surface 14 of an uncoated spectacle lens 12' here has a masking 20 of a partial region 16 of the surface 14. At the boundary line 30, the masking 20 is in contact with the layer 22, for example an antireflection layer or one of the layers of an antireflection layer, which covers the entire surface 14 and the masking 20 within the scope of the partial region 16.

Figure 4:
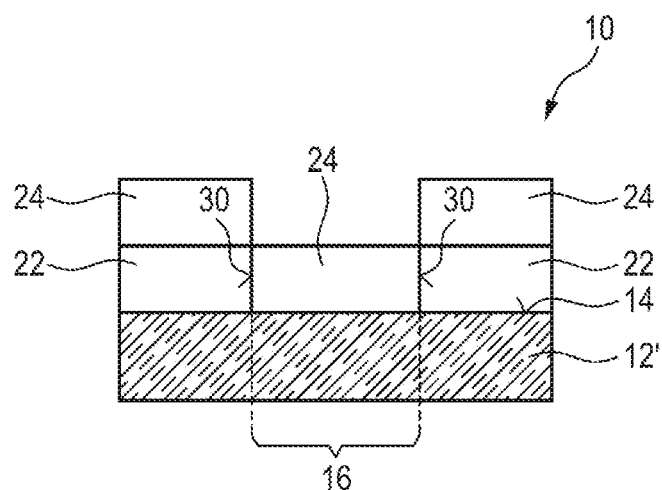
FIG. 4 shows an uncoated spectacle lens with a first layer partly covering the surface, and a second layer completely covering the surface.

FIG. 4 shows the uncoated spectacle lens 10 in accordance with FIG. 3 after the masking 20 and the layer 22 present on the masking have been removed by means of wiping away using a cotton cloth impregnated with acetone and subsequent washing away using acetone and a further layer 24 has been applied on the surface of the layer 22 and in the region 16 on the surface 14 of the uncoated spectacle lens 12'. The layer 22 is a first layer of an antireflection layer, and the layer 24 is a second layer of an antireflection layer. Both layers have different reflection maxima in the range of visible light, thus resulting in a reflection image in accordance with the reflection properties of the second layer 24 in the masked partial region 16 of the surface 14. For the uncoated partial region 14 of the surface, by contrast, the reflection results from the properties of both layers 22 and 24.

Figure 5:
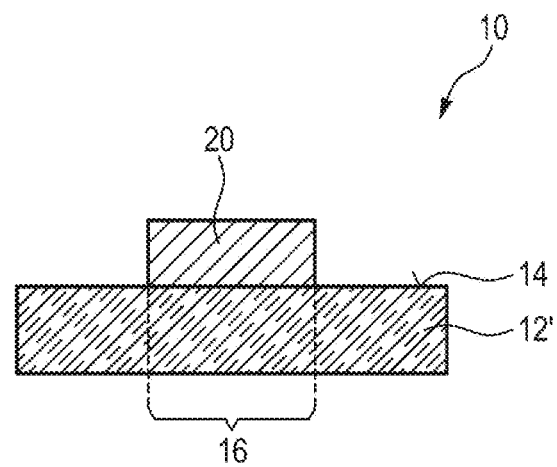
FIG. 5 shows an uncoated spectacle lens with masking.

FIG. 5 shows a spectacle lens 10. A masking 20 produced by means of an inkjet printing method is present on a partial region 16 of the surface 14 of an uncoated spectacle lens 12'.

Figure 6:
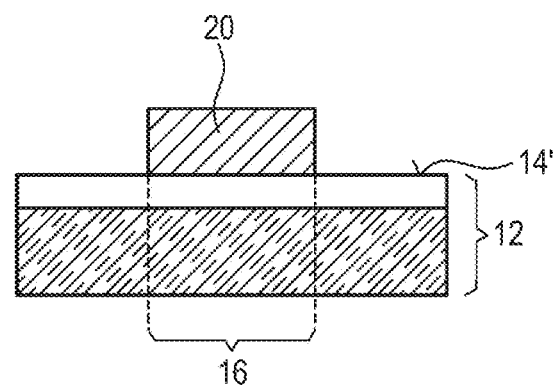
FIG. 6 shows a coated spectacle lens with masking.

FIG. 6 shows a spectacle lens 10 with a masking 20 produced by means of an inkjet printing method on a partial region 16 of the surface 14' of a coated spectacle lens 12.

Figure 7:
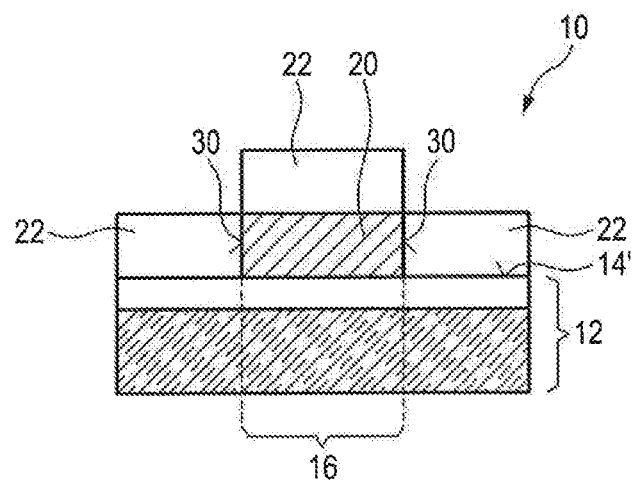
FIG. 7 shows a coated spectacle lens with coating and a partial region provided with a masking.

FIG. 7 shows a spectacle lens 10 with a masking 20 produced by means of an inkjet printing method on a partial region 16 of the surface 14' of a coated spectacle lens 12. The coating of the coated spectacle lens 12 is a reflection layer. A coating 22, likewise embodied as a reflection layer, is present on the masked partial region 20 and on the surface 14'. Both reflection layers have different layer thicknesses, as a result of which different reflection colors are obtained. At the boundary line 30, the masking 20 is in contact with the layer 22.

Figure 8:
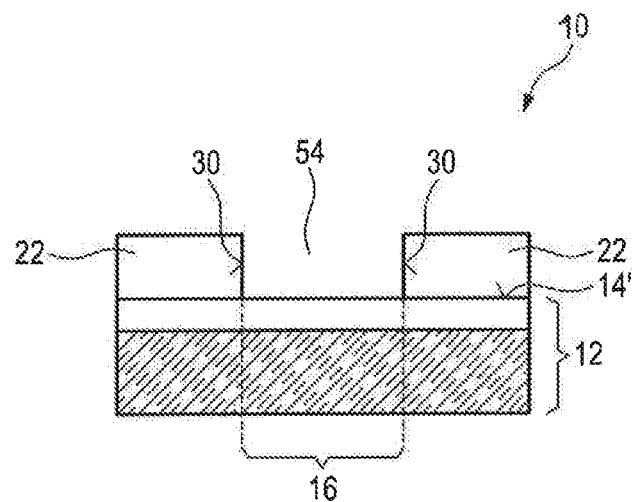
FIG. 8 shows a coated spectacle lens with a layer applied on parts of a surface.

FIG. 8 shows a spectacle lens 10 obtained by removing the masking 20, which was applied by means of the inkjet printing method, from the coated spectacle lens 12 from FIG. 7. Together with the inkjet ink, the portion of the coating 22 present thereon is likewise removed. Consequently, the spectacle lens 10 comprises the layer 22 only on the unmasked region of the surface 14' of the coated spectacle lens 12, whereas the formerly masked region 54 has no layer 22. A light microscope can be used to show that the boundary line 30 has the corresponding pixel structure and corresponding resolution of the inkjet printing method used.

Figure 9A:
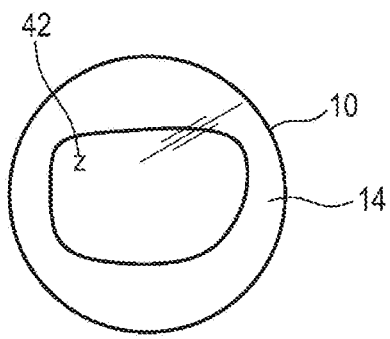
FIGS. 9A and B show a roughly circular spectacle lens with a masking applied thereon and also the negative thereof.

FIG. 9A shows one example of a roughly round spectacle lens 10 according to the disclosure having a surface 14. A masking 42 is provided on the surface 14 of the spectacle lens 10 by means of an inkjet printing method.

Figure 9B:
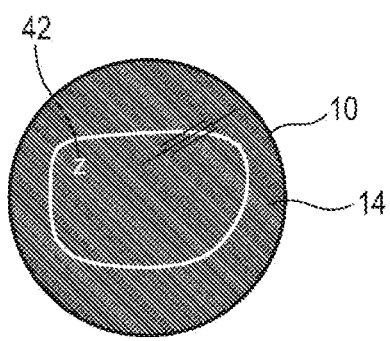

FIG. 9B shows the spectacle lens 10 after wiping away the ink together with the layer 22 deposited thereon. A negative of the masking applied by printing is left behind, the negative being visible only by means of the residual reflection.

Figure 10A:
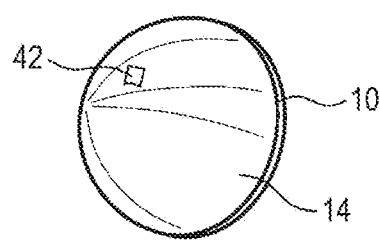
FIGS. 10A and B show a roughly circular spectacle lens with masking applied thereon and an enlarged view of the masking.
Figure 10B:

FIG. 10A shows the surface 14 of a roughly round spectacle lens 10 according to the disclosure. The masked partial region 16 is present in the form of a pattern 42. The enlarged view of the pattern 42 is shown in FIG. 10B and has the applicant's company logo in the present case.

Figure 11:
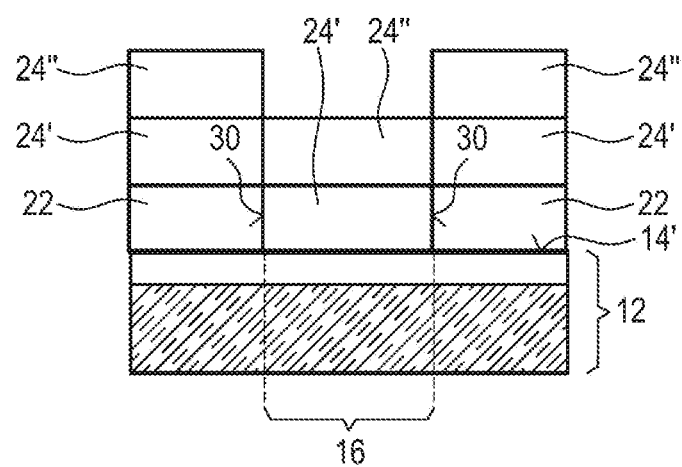
FIG. 11 shows a coated spectacle lens with a first layer present on a partial region of the surface, and two further layers present thereon and covering the entire surface.

FIG. 11 shows a coated spectacle lens 12 having a first layer 22, which is present on a partial region of the surface, and two further layers 24', 24" present thereon and covering the entire surface. The first layer 22 was produced according to the method according to the disclosure and, consequently, is not present in the partial region 16. By contrast, the layer 24' covers the layer 22 and the surface 14' in the partial region 16. The layer 22 thus abuts the layer 24' at the boundary line 30. The layer 24" completely covers the layer 24'.

Figure 12:
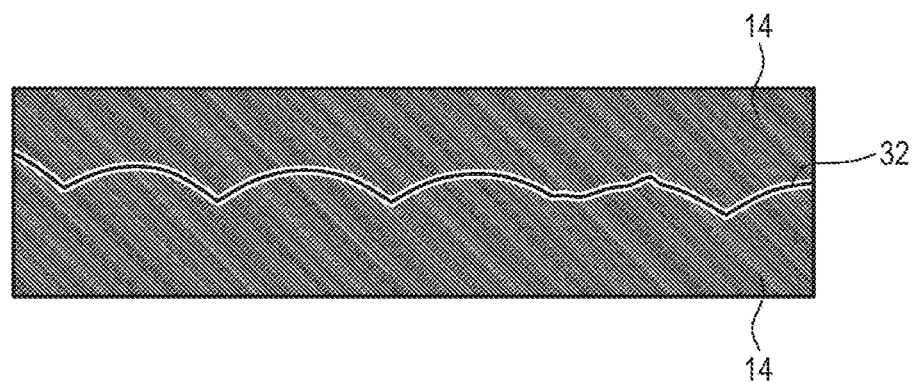
FIG. 12 shows an outline edge or boundary line of a masking produced by means of inkjet printing with 50-fold magnification by a light microscope.

FIG. 12 shows the contour edge or boundary line 30 produced by means of an inkjet printing method with 50-fold magnification by a light microscope. The pixel size of the printer of 177.17 px/cm (approximately 450 dpi) is clearly visible. The contour edge or boundary line appears sharp. The resolution is thus sufficient to image, e.g., a data matrix code in accordance with DIN EN ISO 8980-2, section 7.1 for progressive spectacle lenses.

Figure 13:
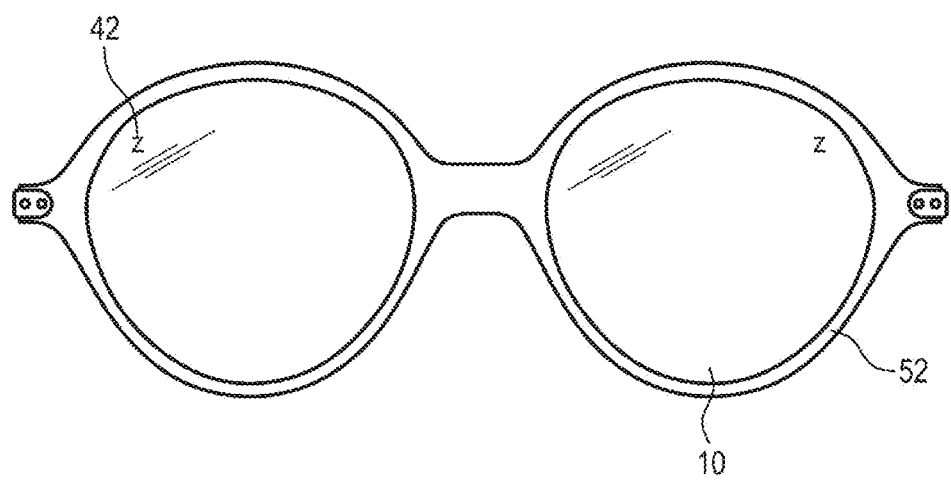
FIG. 13 shows a plan view of spectacles with a reflection image present on the spectacle lenses.

FIG. 13 shows the plan view of spectacles comprising a frame 52. The spectacle lenses 10 are mounted in the frame 52 and each have a pattern 42, which can be perceived in the form of a reflection image.

To summarize, the solutions proposed herein make it possible to produce a high-resolution reflection image in the visible and also non-visible spectral range. The reflection image can have information in the form of a pattern or a marking signal. The method according to the disclosure constitutes an alternative to laser marking and provides additional individualization parameters.

The disclosure is explained in greater detail below by means of some examples, but these do not restrict the disclosure.

I Production of the Spectacle Lenses According to the Disclosure According to the Method According to the Disclosure

Examples 1 to 5: Method According to the Disclosure Using an Antireflection Layer A spectacle lens semifinished product based on polythiourethane (MR 8, from Mitsui Chemicals, Inc.) with a medium refractive index of 1.598 was provided with a hard layer by dip coating. On the front surface of the spectacle lens semifinished product coated in this way, at least one masking was applied using the inkjet printer X-Cube 01 from Tecoptique in each case in accordance with Table 1 below. YWE (Yellow) from Tecoptique was used as inkjet ink. In the box coater Syrus III from Bühler Leybold Optics GmbH, the spectacle lens semifinished product masked in this way was provided with an antireflection layer composed of six alternating layers of ZrO and SiO$_2$, beginning with ZrO directly on the hard layer. The masking of the spectacle lens semifinished product coated to completion was removed by means of manual polishing using a cotton cloth impregnated with acetone and the hard layer situated underneath was thus exposed again. The spectacle lens semifinished product thus produced exhibited in each case a sharply delineated reflection image which is clearly visible at suitable angles using test light and which represents an exact negative of the masking applied previously. In order to obtain the dioptric power, the back surface of the spectacle lens semifinished product was mechanically processed in each case.

TABLE 1

| Example | Masking | Position (in relation to distance visual point) | Dioptric power | Basic curve |
|---|---|---|---|---|
| 1 | ZEISS lettering (3 × 10 mm) | temporal | Sphere −2.0 diopters | 4.0 diopters |
| 2 | ZEISS lettering (3 × 10 mm) | central | Sphere −2.0 diopters | 4.0 diopters |
| 3a | ZEISS lettering (3 × 10 mm) | temporal | Sphere −3.48 diopters, cylinder −0.76 diopter, axis 148° | 3.0 diopters |
| 3b | ZEISS lettering (3 × 10 mm) | temporal | Sphere −1.22 diopters, cylinder −0.66 diopter, axis 123° | 4.0 diopters |
| 4 | ZEISS trademark (20 × 20 mm) | central | Sphere −2.0 diopters | 4.0 diopters |
| 5a | ZEISS trademark (20 × 20 mm) | central | Sphere −3.48 diopters, cylinder −0.76 diopter, axis 148° | 3.0 diopters |
| 5b | ZEISS trademark (20 × 20 mm) | central | Sphere −1.22 diopters, cylinder −0.66 diopter, axis 123° | 4.0 diopters |

Comparative Example 1

The spectacle lens semifinished product from comparative example 1 is identical to the spectacle lens semifinished product from example 1, except that the spectacle lens semifinished product from comparative example 1 was not provided with at least one masking.

Examples 6 to 10: Method According to the Disclosure Using a Reflection Layer A spectacle lens semifinished product based on polythiourethane (MR 8, from Mitsui Chemicals, Inc) with a medium refractive index of 1.598 was coated with a hard layer by dip coating. On the front surface of the spectacle lens semifinished product thus obtained, a layer of chromium having a layer thickness of 18 nm was applied in the box coater Syrus III from Baler Leybold Optics GmbH. On the thus reflectively coated front surface of the spectacle lens semifinished product, at least one masking was applied using the inkjet printer X-Cube 01 from Tecoptique in each case in accordance with Table 2 below. YWE (Yellow) from Tecoptique was used as inkjet ink. The spectacle lens semifinished product masked in this way was provided with an SiO$_2$ layer having a layer thickness of 55 nm in a renewed PVD coating step. The masking of the spectacle lens semifinished product coated to completion was removed by means of manual polishing using a cotton cloth impregnated with acetone and the chromium layer situated underneath was thus exposed again. The spectacle lens semifinished product thus produced exhibited in each case an aesthetically sophisticated silver reflection image on an otherwise bronze-colored reflective coating.

TABLE 2

| Example | Masking | Position (in relation to distance visual point) | Dioptric power | Basic curve |
|---|---|---|---|---|
| 6 | ZEISS lettering (3 × 10 mm) | temporal | Sphere −2.0 diopters | 4 diopters |
| 7 | ZEISS lettering (3 × 10 mm) | central | Sphere −2.0 diopters | 4 diopters |
| 8a | ZEISS lettering (3 × 10 mm) | temporal | Sphere −3.48 diopters, cylinder −0.76 diopter, axis 148° | 3.0 diopters |
| 8b | ZEISS lettering (3 × 10 mm) | temporal | Sphere −1.22 diopters, cylinder −0.66 diopter, axis 123° | 4.0 diopters |

TABLE 2-continued

| Example | Masking | Position (in relation to distance visual point) | Dioptric power | Basic curve |
|---|---|---|---|---|
| 9 | ZEISS trademark (20 × 20 mm) | central | Sphere −2.0 diopters | 4 diopters |
| 10a | ZEISS trademark (20 × 20 mm) | central | Sphere −3.48 diopters, cylinder −0.76 diopter, axis 148° | 3.0 diopters |
| 10b | ZEISS trademark (20 × 20 mm) | central | Sphere −1.22 diopters, cylinder −0.66 diopter, axis 123° | 4.0 diopters |

II Characterization of the Spectacle Lenses Produced According to the Method According to the Disclosure IIa Examination by Light Microscope Upon examination by a light microscope (50-fold magnification), the spectacle lens semifinished products in examples 1 to 10 exhibited a clear boundary line between the partial region of the surface which was provided with the masking that was removed again and the surface which was provided without masking. The individual pixels of the masking applied by means of inkjet ink were clearly visibly recognizable in the light microscope micrographs.

IIb Weathering Test

The spectacle lens semifinished products of examples 2 and 4 and the spectacle lens semifinished product in accordance with comparative example 1 were mechanically predamaged in each case in a drum filled with sand, small pieces of abrasive paper and felt at 120 rpm and were then subjected to an accelerated weathering test (test unit: QUV-accelerated weathering test unit with UVA 340 light source, Q-Lab Deutschland GmbH) with 24 exposure cycles. A visual inspection for mechanical damage of the antireflection layer by means of light microscope micrographs with 10-fold magnification revealed no discernible differences between the spectacle lens semifinished products of the examples and the corresponding spectacle lens semifinished product of the comparative example.

IIc Boiling Test

The spectacle lens semifinished products of examples 2 and 4 the spectacle lens semifinished products in accordance with comparative example 1 were introduced into boiling demineralized water for three hours. A visual assessment after subsequent drying revealed no delamination of the antireflection layer on the spectacle lens semifinished products of the examples.

IId Polishing Test

The spectacle lens semifinished products of examples 2 and 4 and the spectacle lens semifinished product in accordance with comparative example 1 were polished 100 times using a cotton cloth impregnated with acetone. According to visual assessment, after these 100 polishing cycles, only minimal differences could be discerned between the spectacle lens semifinished products of the examples and the spectacle lens semifinished product of the comparative example.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for producing a coating on a surface of a coated or uncoated spectacle lens, the method comprising:
    applying a masking on a partial region of a surface of the coated or uncoated spectacle lens with a matrix printer;
    applying a layer on the masking and on a remaining region of the surface of the coated or uncoated spectacle lens; and
    removing the masking and a portion of the layer applied on the masking from the partial region of the surface of the coated or uncoated spectacle lens,
    wherein a proportion of the partial region of the surface of the coated or uncoated spectacle lens is 20% or less relative to an entire surface region of a finished, edged spectacle lens made from the coated or uncoated spectacle lens, and
    wherein the layer is a part of an antireflection layer having a multilayered construction.

2. The method as claimed in claim 1, wherein the matrix printer is an inkjet printer.

3. The method as claimed in claim 1, wherein the layer is a first layer, the method further comprising at least one of:
    applying a second layer on the surface of the coated or uncoated spectacle lens before applying the masking, or
    applying the second layer on the partial region of a surface of the coated or uncoated spectacle lens and on the layer on the remaining region of the surface of the coated or uncoated spectacle lens after removing the masking from the partial region.

4. The method as claimed in claim 1, wherein the removal of the masking comprises at least one of:
    wiping away the masking, or
    dipping the coated or uncoated spectacle lens into a solvent, wherein the solvent includes acetone.

5. The method as claimed in claim 1, wherein the layer has a reflection maximum in a visible spectral range or in a non-visible spectral range.

6. The method as claimed in claim 1, wherein the coated or uncoated spectacle lens is a lens blank, a spectacle lens semifinished product, or a finished spectacle lens.

7. The method as claimed in claim 1, wherein the masking of the partial region comprises a radiation-curable inkjet ink.

8. A spectacle lens produced by the method as claimed in claim 1.

9. The spectacle lens as claimed in claim 8, wherein a proportion of the partial region is 0.05% to 17% relative to the entire surface region of the finished, edged spectacle lens made from the coated or uncoated spectacle lens.

10. The spectacle lens as claimed in claim 8, wherein the partial region has a shape of a pattern.

11. A spectacle lens comprising:
a layer applied selectively on a partial region of a surface of the spectacle lens,
wherein a boundary line between the partial region and an adjoining partial region in which the layer is not applied is defined by a printing with a matrix printer,
wherein the layer applied selectively on the partial region of the spectacle lens defines a reflection image,
wherein a proportion of the partial region of the spectacle lens provided with the reflection image is 20% or less relative to an entire surface of a finished, edged spectacle lens made from the spectacle lens, and
wherein the layer applied selectively on the partial region of the spectacle lens is a part of a multilayered construction.

12. The spectacle lens as claimed in claim 8, wherein the spectacle lens is a lens blank, a spectacle lens semifinished product, or a finished spectacle lens.

13. A method for producing a coating on a surface of a coated or uncoated spectacle lens, the method comprising:
applying a masking on a partial region of a surface of the coated or uncoated spectacle lens with a matrix printer;
applying a layer on the masking and on a remaining region of the surface of the coated or uncoated spectacle lens; and
removing the masking and a portion of the layer applied on the masking from the partial region of the surface of the coated or uncoated spectacle lens,
wherein a proportion of the partial region of the surface of the coated or uncoated spectacle lens is 10% to 30% relative to an entire surface region of a finished, edged spectacle lens made from the coated or uncoated spectacle lens,
wherein the partial region is a circumferential edge region arranged at a constant distance from a boundary of the surface, and
wherein the layer is a part of an antireflection layer having a multilayered construction.

14. A spectacle lens comprising:
a layer applied selectively on a partial region of a surface of the spectacle lens,
wherein a boundary line between the partial region and an adjoining partial region in which the layer is not applied is defined by a printing with a matrix printer,
wherein the layer applied selectively on the partial region of the spectacle lens defines a reflection image,
wherein a proportion of the partial region of the surface of the coated or uncoated spectacle lens is 10% to 30% relative to an entire surface region of a finished, edged spectacle lens made from the coated or uncoated spectacle lens,
wherein the partial region is a circumferential edge region arranged at a constant distance from a boundary of the surface, and
wherein the layer is a part of a multilayered construction.

15. The spectacle lens as claimed in claim 10, wherein the pattern is a logo, a letter, a negative of the logo, or a negative of the letter.

16. The spectacle lens as claimed in claim 11, wherein the boundary line has a pixel structure.

17. The spectacle lens as claimed in claim 14, wherein the boundary line has a pixel structure.

* * * * *

UNITED STATES PATENT AND TRADEMARK OFFICE
CERTIFICATE OF CORRECTION

PATENT NO. : 11,747,649 B2
APPLICATION NO. : 16/449027
DATED : September 5, 2023
INVENTOR(S) : Jeremias Gromotka It is certified that error appears in the above-identified patent and that said Letters Patent is hereby corrected as shown below:

In the Specification

In Column 1, Line 62: change "a really" to -- areally --

In Column 8, Line 45: change "Baler" to -- Bühler --

In Column 11, Line 40: change "$Na_3AlF_6$ and $Na_5Al_3Fi_4$" to -- $Na_3AlF_6$ and $Na_5Al_3F_{14}$ --

In Column 22, Line 33: change "Baler" to -- Bühler --

Signed and Sealed this
Third Day of October, 2023

Katherine Kelly Vidal
*Director of the United States Patent and Trademark Office*